June 23, 1970

R. M. SHAH 3,516,801

LABORATORY SUPPORT RING

Filed July 17, 1967

INVENTOR.
RAMESH M. SHAH
BY
ATTORNEY

United States Patent Office 3,516,801
Patented June 23, 1970

3,516,801
LABORATORY SUPPORT RING
Ramesh M. Shah, Indianapolis, Ind., assignor to Eli Lilly and Company, Indianapolis, Ind., a corporation of Indiana
Filed July 17, 1967, Ser. No. 653,965
Int. Cl. B01l 9/00
U.S. Cl. 23—292                    4 Claims

ABSTRACT OF THE DISCLOSURE

A laboratory support ring for supporting large and bulky separatory funnels and similar equipment in which the ring has an additional bifurcated supporting means for preventing sagging of the laboratory equipment.

BACKGROUND OF THE INVENTION

This invention relates to laboratory support rings and in particular to an improved ring which is capable of accommodating unusually long, bulky, and heavy loads without sagging.

The use of column chromatography has become an important method for purification of natural products subjected to laboratory study. A large glass column comprises a portion of the laboratory equipment needed for chromatography. On top of the column a bulky separatory funnel is positioned. A reagent is placed in the separatory funnel in order to obtain the necessary continuous flow of the reagent through the column. The combined weight of this unit is substantial since the reagent may be anywhere from 4–12 liters.

The conventional means for supporting chromatography equipment is a retort stand comprising a metallic ring connected to a straight rod which is fixed to a vertical rod by an adjustable clamp. Although this design of ring and ring stand is adequate for many uses, it is subject to sagging and even overturning when large loads are placed on it. Heretofore, efforts to strengthen the ring stand have resulted in reinforced structures which prevent items such as funnels from extending through the ring.

SUMMARY

The ring support of this invention is used with a conventional ring stand and is used in a manner similar to standard ring supports. In general, the improvement of this invention comprises a secondary support member connected at two points on the ring and inclined downwardly toward the vertical rod of the ring stand. The secondary support is connected to a horizontal auxiliary support rod which is spaced directly below the conventional rod integrally fixed to the ring. The free ends of the two horizontal support rods are adjustably connected to the stand rod.

It is therefore one object of this invention to provide a new and improved ring support capable of providing rigid support to heavy laboratory equipment.

Another object of this invention is to provide a new and improved ring support which is adapted for allowing the full extension of equipment through the ring.

Other objects and advantages of this invention will be apparent upon reading the following description in connection with the drawing.

DESCRIPTION OF THE PREFERRED EMBODIMENT

Figure 1:
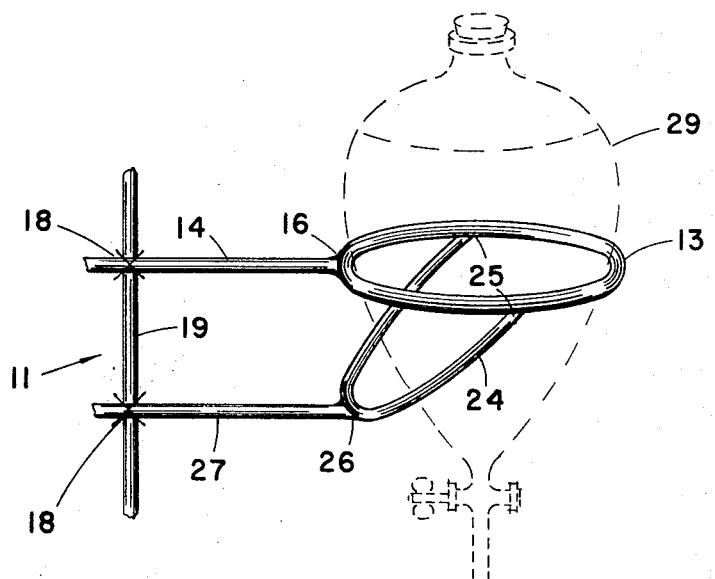
FIG. 1 is a perspective view of the support ring of this invention and a separatory funnel contained therein.
Figure 2:
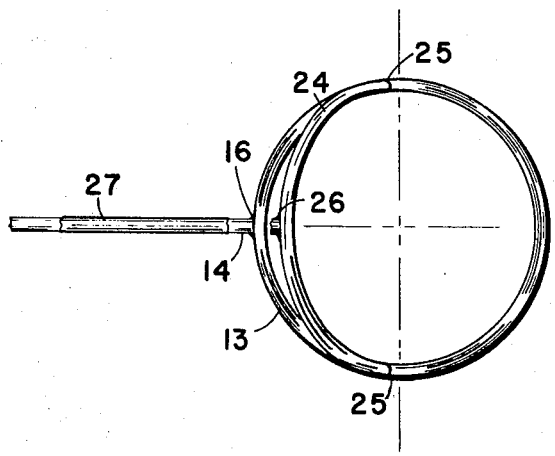
FIG. 2 is a bottom plan view of the support ring of this invention.

Referring to FIGS. 1 and 2, the support ring 11 of this invention comprises a conventional ring 13 having an integral primary support rod 14 outwardly extending on a radial line from a point 16 on the ring. Laboratory support rings of this description are generally formed from metallic rods. An adjustable clamp 18, symbolically represented by a pair of crossed lines in FIG. 1, may be provided on the free end of the primary support rod 14 for clamping onto a vertical rod 19 of a stand.

The improvement in accordance with the illustrated laboratory support ring of this invention is as follows. A secondary support member 24 is connected to the ring 13 at two spaced points 25 thereon substantially equidistant from the support rod 14 and approximately 180° apart. Thus, a line drawn between the two connections 25 of the secondary support member is preferably parallel to an imaginary tangential line at the point of connection 16 between the primary support rod 14 and ring 13. It is also to be noted that the two connection points 25 for the secondary support member need not necessarily form the ends of a line drawn through the center of the ring 13. Thus, these points may be positioned closer to point 16 to further provide clearance through ring 13. The preferred range of spacing for points 25 is 120° to 190°.

The secondary support member 24, as shown in the preferred embodiment is inclined downwardly and toward the vertical rod 19 of the ring stand. It has been found that an angle of approximately 45° will normally suffice for the purposes of this invention. Thus, the midpoint 26 of the secondary support member 24 is connected to an auxiliary support rod 27 which lies in the vertical plane of the primary support rod 14 and spaced parallel and below the primary support rod. The free end of auxiliary support rod 27 may also be provided with a clamping means 18 for connecting it to the vertical rod 19 of the ring stand.

The illustrated form of the secondary support member 24 of this invention is shown to be arcuate. It is to be understood that this secondary support member could comprise a pair of converging straight members. However, the use of an arcuate support member will generally provide better clearance with respect to the separatory funnel 29 that is nested in the support ring 13. If a pair of straight members are substituted for the arcuate support member 24, it is probable that the support member's angle with respect to the horizontal plane will be less than 45° in order to assure clearance of the laboratory device extending through the ring.

The use of the secondary support member in the manner described above substantially increases the supporting capabilities of the conventional ring 13. By connecting the secondary support member 24 to the vertical rod of the ring stand 21 with an adjustable auxiliary support rod 27, two points of connection have been achieved. Thus, the likelihood of sagging on the part of the ring is greatly decreased and the stability of the unit is significantly improved.

Although the purpose of the angular position of the secondary support member is primarily to provide sufficient space for a container such as a separatory funnel to pass through the ring without encountering unwanted obstructions, it is apparent that this novel structure is also useful for supporting other heavy loads. Thus, this support device may be useful for supporting heavy round-bottomed containers on conventional heating mantles which do not necessarily extend beyond the support ring more than three or four inches. It is also apparent that other types of containers in addition to separatory funnels may be supported in this device.

Although only one embodiment of this invention has been illustrated and described, it will be apparent that other modifications may be made without departing from the spirit of this invention and the scope of the appended claims.

I claim:

1. In combination with a laboratory support ring having an integral primary support rod outwardly extending on a radial line from a connection point on the ring with the free end of said primary support rod having an adjustable clamp means connected to a vertical rod, the improvement comprising: a secondary support member connected to said support ring at two points thereon substantially equidistant from the support rod and spaced apart within the range of 120° to 190°, said secondary support member having its midpoint connected to an auxiliary support rod lying in the vertical plane of said primary support rod and spaced parallel and below said primary support rod, the free end of said auxiliary support rod having an adjustable clamp means connected to said vertical rod whereby a lower extension of a container nested in said support ring may extend through said support ring free of contact with said secondary support member and auxiliary support rod.

2. An improved laboratory support ring according to claim 1 in which said secondary support member is inclined with respect to said primary support rod an angle of approximately 45°.

3. An improved laboratory support ring according to claim 2 in which said secondary support member is arcuate.

4. An improved laboratory support ring according to claim 3 in which the connection point between said secondary support member and said auxiliary support rod is substantially on a vertical line passing through the connection point between the primary support rod and support ring.

References Cited
UNITED STATES PATENTS

| | | | |
|---|---|---|---|
| 2,666,641 | 1/1954 | Bonham | 248—315 XR |
| 2,919,091 | 12/1959 | Vandercook | 248—311XR |

MORRIS O. WOLK, Primary Examiner

D. G. MILLMAN, Assistant Examiner

U.S. Cl. X.R.

23—259; 248—125, 221, 311, 315